US009316439B2

(12) United States Patent
Tucker

(10) Patent No.: US 9,316,439 B2
(45) Date of Patent: Apr. 19, 2016

(54) DEWATERING MACHINE AND PROCESS

(75) Inventor: Christopher S. Tucker, Canton, OH (US)

(73) Assignee: NFM Welding Engineers, Inc., Massillon, OH (US)

( * ) Notice: Subject to any disclaimer, the term of this patent is extended or adjusted under 35 U.S.C. 154(b) by 53 days.

(21) Appl. No.: 14/114,763

(22) PCT Filed: May 14, 2012

(86) PCT No.: PCT/US2012/037702
§ 371 (c)(1),
(2), (4) Date: Sep. 5, 2014

(87) PCT Pub. No.: WO2012/158582
PCT Pub. Date: Nov. 22, 2012

(65) Prior Publication Data
US 2015/0316321 A1    Nov. 5, 2015

Related U.S. Application Data

(60) Provisional application No. 61/485,762, filed on May 13, 2011.

(51) Int. Cl.
| *C08J 3/12* | (2006.01) |
| *F26B 17/20* | (2006.01) |
| *B29C 47/40* | (2006.01) |
| *B29C 47/82* | (2006.01) |
| *B01D 43/00* | (2006.01) |
| *B30B 9/16* | (2006.01) |
| *B29C 47/68* | (2006.01) |
| *B29C 47/76* | (2006.01) |
| *B29C 47/00* | (2006.01) |
| *F26B 5/14* | (2006.01) |
| *B29C 47/36* | (2006.01) |
| *B29C 47/60* | (2006.01) |
| *B29K 55/02* | (2006.01) |

(52) U.S. Cl.
CPC ............... *F26B 17/20* (2013.01); *B01D 43/00* (2013.01); *B29C 47/0009* (2013.01); *B29C 47/366* (2013.01); *B29C 47/369* (2013.01); *B29C 47/402* (2013.01); *B29C 47/6012* (2013.01); *B29C 47/6018* (2013.01); *B29C 47/68* (2013.01); *B29C 47/762* (2013.01); *B29C 47/763* (2013.01); *B29C 47/767* (2013.01); *B29C 47/82* (2013.01); *B29C 47/822* (2013.01); *B29C 47/825* (2013.01); *B30B 9/16* (2013.01); *F26B 5/14* (2013.01); *B29K 2055/02* (2013.01); *F26B 2200/08* (2013.01)

(58) Field of Classification Search
CPC ...................................... C08J 3/12; C08J 6/04
USPC ......................................................... 528/502
See application file for complete search history.

(56) References Cited

U.S. PATENT DOCUMENTS

| 2,833,750 | A | * | 5/1958 | Vickers | ................... B29B 13/00 159/2.2 |
| 3,222,797 | A | * | 12/1965 | Zies | ......................... B29B 13/06 159/2.2 |
| 4,440,511 | A | | 4/1984 | Ishibashi et al. | |
| 4,693,293 | A | | 9/1987 | Yamamoto et al. | |
| 4,802,769 | A | | 2/1989 | Tanaka | |
| 4,970,037 | A | | 11/1990 | Kafka et al. | |
| 5,025,044 | A | * | 6/1991 | Christell | ............. B29C 47/1063 523/334 |
| 5,213,010 | A | | 5/1993 | Hayafusa et al. | |
| 5,283,021 | A | | 2/1994 | Shih | |
| 5,958,316 | A | | 9/1999 | Guntherberg et al. | |
| 6,165,399 | A | | 12/2000 | Guntherberg et al. | |
| 6,220,745 | B1 | | 4/2001 | Kobayaski et al. | |
| 6,287,470 | B1 | | 9/2001 | Vetter et al. | |
| 2002/0188098 | A1 | | 12/2002 | Hoess et al. | |
| 2006/0034962 | A1 | * | 2/2006 | Guntherberg | ......... B29C 47/761 425/208 |

FOREIGN PATENT DOCUMENTS

| JP | 59214631 | 4/1984 |
| JP | 02286208 | 11/1990 |
| JP | 3193412 | 8/1991 |
| JP | 4139202 | 5/1992 |
| JP | 2005538877 A | 12/2005 |
| JP | 2006291187 | 10/2006 |
| RU | 2008223 C1 | 12/1991 |
| SU | 1095947 A | 12/1982 |
| SU | 1599209 A1 | 4/1988 |
| WO | 2006098287 A1 | 9/2006 |

* cited by examiner

*Primary Examiner* — Terressa Boykin
(74) *Attorney, Agent, or Firm* — Dureska, Kennedy & Moore, LLC; David P. Dureska; Edward T. Kennedy

(57) ABSTRACT

A dewatering machine for reducing moisture of a polymer or an elastomer includes a generally solid barrel and a pair of screws disposed in the barrel. At least a portion of the screws are intermeshing, and drive means are coupled to the screws. At least one mechanical filter is connected to the barrel. The machine includes means that enable particles of the polymer or the elastomer to fuse, which reduces the amount of fines that escape from the machine. In addition, the machine reduces the moisture of the polymer from up to about 20 percent water by weight to less than about 0.5 percent water by weight, and the moisture of the elastomer from up to about 50 percent water by weight to less than about 3.0 percent water by weight. A method of dewatering for reducing the moisture of a polymer or an elastomer is also provided.

20 Claims, 9 Drawing Sheets

DEWATERING MACHINE AND PROCESS

CROSS-REFERENCE TO RELATED APPLICATIONS

This application claims the benefit of PCT Application Ser. No. PCT/US2012/037702, filed on May 14, 2012, which claims the benefit of U.S. Provisional Application Ser. No. 61/485,762, filed on May 13, 2011.

BACKGROUND OF THE INVENTION

1. Technical Field

The invention relates to the art of dewatering and drying of polymers and elastomers. More particularly, the invention relates to the art of mechanical dewatering and drying machines that are used in the finishing of the formulation of certain polymers and elastomers. Still more particularly, the invention is directed to an improved dewatering and drying machine and accompanying process which reduce the escape of fine particles encountered in prior art dewatering and drying machines and processes, employs fewer machines than prior art dewatering and drying processes, and reduces the volatility of the dewatering process.

2. Background Art

In the formulation or production of certain polymers and synthetic elastomers, a wet slurry of particles is often created. The slurry typically consists of water and the formulated polymer or elastomer in crumb form, along with fine particles, which are known in the art as fines. These fines are typically in a size range of from about 0.1 millimeters (mm) in diameter to about 4.0 mm in diameter. In order for the polymer or elastomer to be prepared for further use, the slurry water must be removed and the moisture level of the polymer or elastomer then reduced to a level of about 0.5 percent (%) water by weight. The reduction of moisture is often performed by a dewatering and drying process, which will be described in detail below.

In the art, dewatering is often viewed as a first step in which the moisture of the polymer or elastomer is reduced to a level of about 5% to about 15% of water by weight, and drying is viewed as a second step in which the moisture of the polymer or elastomer is reduced from the 5-15% percent level to a level of about 0.5% water by weight. However, for the purpose of convenience, reference below shall be made to the term dewatering with the understanding that such reference also includes drying, without affecting the overall concept or operation of the invention.

In the prior art, during the dewatering process, many fines typically escape with the moisture that is being removed, and must either then be recycled using undesirable additional equipment and steps, or disposed of, which creates undesirable waste. In addition, prior art dewatering processes typically employ more than one dewatering machine, each of which involves a cost investment to purchase, operate and maintain. Moreover, the dewatering process often involves the escape of vapors and/or particles that may be volatile, and must be contained. However, the design of certain prior art dewatering machines makes such containment difficult.

As a result, there is a need in the art for an improved dewatering machine and accompanying process that overcome the disadvantages of the prior art by providing removal of sufficient water with a single machine, reduction of the escape of fines, and reduction of volatility. The improved dewatering machine and process of the present invention satisfies this need, as will be described in detail below.

BRIEF SUMMARY OF THE INVENTION

An objective of the present invention is to provide for removal of sufficient water while reducing the number of dewatering and drying machines that are employed.

Another objective of the present invention is to provide a dewatering machine and process that reduces the escape of fines.

Yet another objective of the present invention is to provide a dewatering machine and process that reduces the volatility of the dewatering process.

These objective and others are obtained by the improved dewatering machine for reducing moisture of a polymer or an elastomer of the present invention. By way of example, the dewatering machine includes a generally solid barrel and a pair of screws disposed in the barrel. At least a portion of the screws are intermeshing, and drive means are coupled to the screws. At least one mechanical filter is connected to the barrel to remove moisture from the polymer or the elastomer. The machine includes means that enable particles of the polymer or the elastomer to fuse, which reduces the amount of fines that escape from the machine. In addition, the machine reduces the moisture of the polymer from up to about 20 percent water by weight to less than about 0.5 percent water by weight, and the moisture of the elastomer from up to about 50 percent water by weight to less than about 3.0 percent water by weight.

These objective and others are obtained by the improved method of dewatering for reducing the moisture of a polymer or an elastomer of the present invention. By way of example, the method includes the steps of providing a dewatering machine that includes a generally solid barrel, and disposing a pair of screws in the barrel, in which at least a portion of said screws are intermeshing. The screws are rotated with drive means, and the polymer or elastomer is fed into the barrel and into the screws. The particles of the polymer or the elastomer are fused to reduce an amount of fines escaping the machine, and moisture from the polymer or the elastomer is removed with at least one mechanical filter that is connected to the barrel. The moisture of the polymer is reduced from up to about 20 percent water by weight to less than about 0.5 percent water by weight, and the moisture of the elastomer is reduced from up to about 50 percent water by weight to less than about 3.0 percent water by weight.

BRIEF DESCRIPTION OF THE SEVERAL VIEWS OF THE DRAWINGS

The preferred embodiments of the present invention, illustrative of the best modes in which Applicant has contemplated applying the principles, are set forth in the following description and shown in the drawings, and are particularly and distinctly pointed out and set forth in the appended claims.

Similar numerals refer to similar parts throughout the drawings.

DETAILED DESCRIPTION OF THE INVENTION

In order to better understand the improved dewatering machine and process of the present invention, a discussion of prior art dewatering machines and processes is in order. By way of example, reference herein is provided to the production of the copolymer acrylonitrile butadiene styrene, which is known in the art as ABS. ABS is a copolymer in which a styrene acrylonitrile (SAN) copolymer serves as a matrix for a butadiene styrene (BS) synthetic rubber filler, which is dispersed in the matrix. A method of producing ABS is emulsion polymerization with a graft copolymer, which is blended with SAN mass polymer. This method of ABS production is typically carried out in one of two ways: conventional coagulation or direct latex coagulation.

Figure 1:
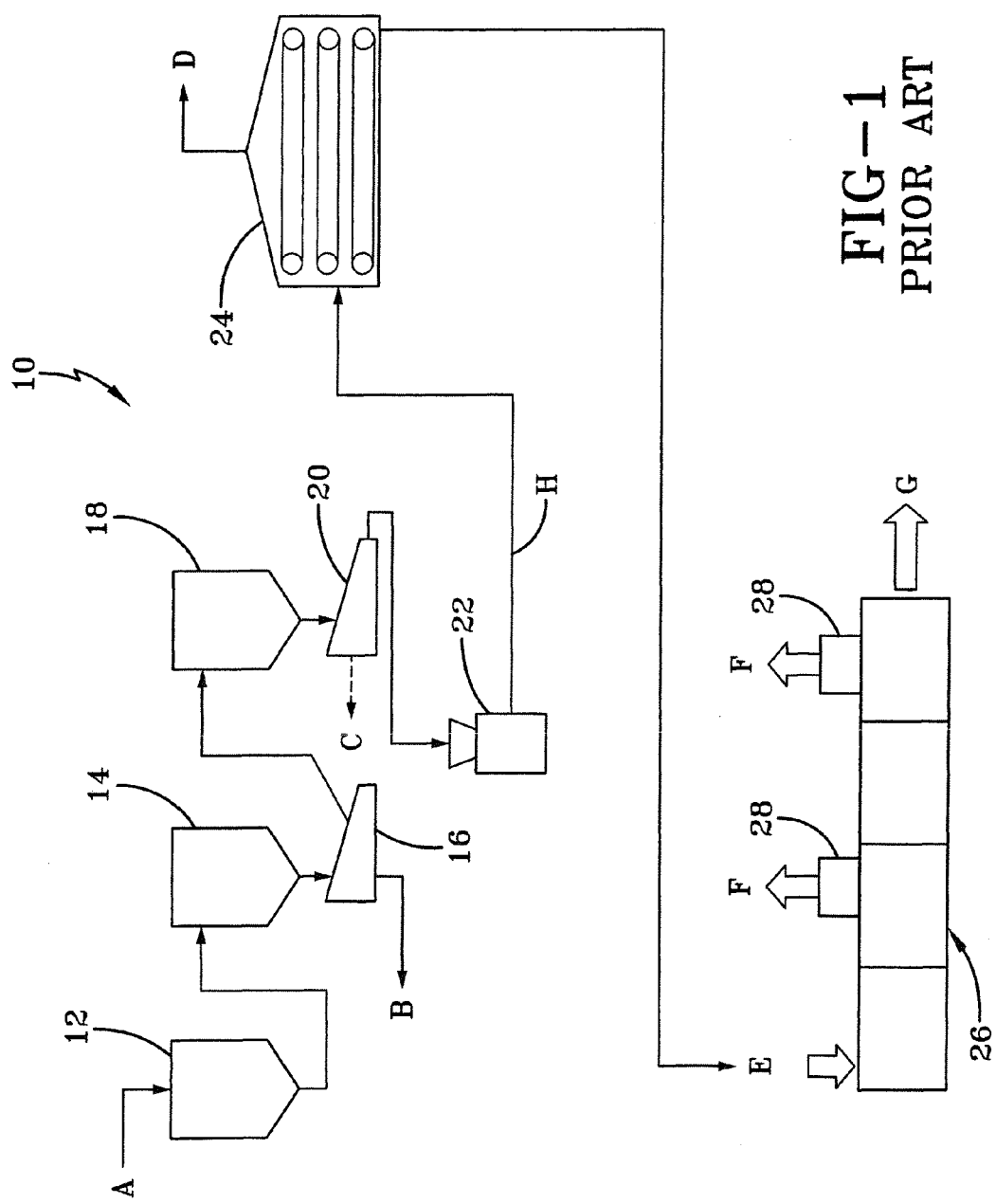
FIG. 1 is a schematic representation of a prior art conventional coagulation process and accompanying equipment for the production of ABS.

A conventional coagulation process is shown in FIG. 1 and is indicated generally at 10. In conventional coagulation process 10, stripped latex, indicated by A, is introduced into a blend tank 12 and is then transferred by pipe or other means known in the art to a coagulation tank 14. After coagulation in tank 14, effluent material, indicated by B, is removed by separation or screening employing a first screen 16, and the remaining particles are introduced into a wash tank 18. After the particles are washed in tank 18, a wet slurry is present, which includes water, the formulated ABS in crumb form, and fines. The slurry is fed over a second screen 20, which removes a large percentage of the free water from the slurry, indicated by C, and the remaining slurry is introduced into a centrifuge 22 for further removal of water. Centrifuge 22 reduces the moisture content of the ABS crumb to approximately 20% to 30% of water by weight, indicated by H.

In order to continue to reduce the moisture content of ABS crumb H, the crumb is transferred to a thermal dryer 24, which reduces the moisture content of the crumb to about 0.4 to 1.0% of water by weight. In thermal dryer 24, while volatile emissions from the ABS crumb are removed by an exhaust system, indicated by D, the combination of heat and volatile emissions in the dryer may undesirably enable fires and/or dust explosions to occur. In addition, thermal dryer 24 undesirably requires a significant amount of energy to operate.

After passing through thermal dryer 24, dry ABS crumb is transferred to a compounding extruder 26. Feed to extruder 26, indicated by E, includes the ABS crumb, SAN pellets, and any other additives. Compounding extruder 26 typically is a twin-screw extruder, with co-rotating screws (not shown). As known in the art, compounding extruder 26 melts and mixes the ABS crumb, the SAN pellets, and any other additives, while removing vapors and/or additional moisture, indicated by F, through one or more vents 28, to arrive at a final compounded ABS product, indicated by G. A disadvantage of the transfer of dry ABS crumb to compounding extruder 26 is that, when handled as a crumb, ABS graft copolymer may be lost. In addition, the throughput capacity of compounding extruder 26 may be limited due to the low bulk density of the ABS crumb.

Figure 2:
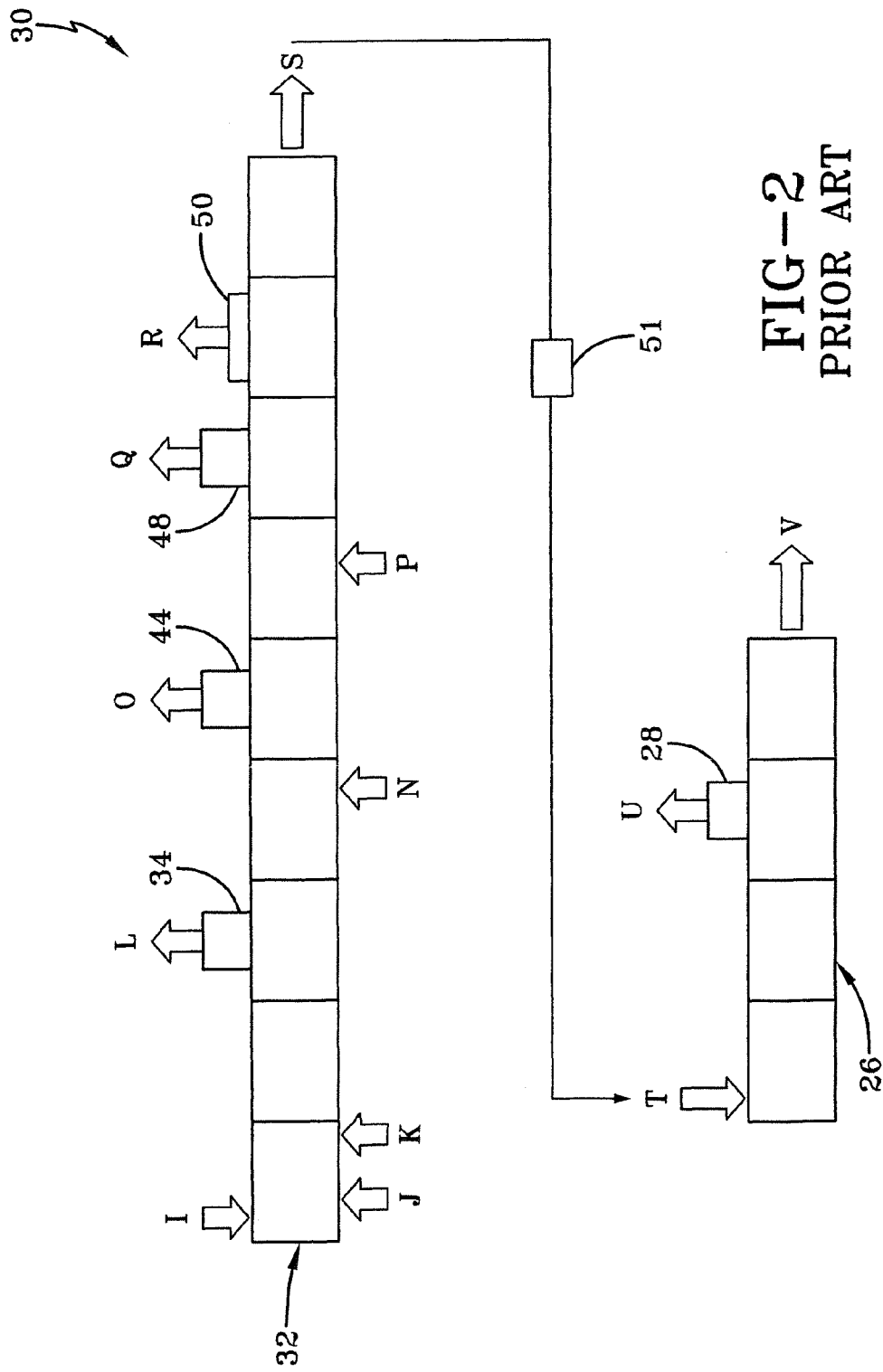
FIG. 2 is a schematic representation of a prior art direct latex coagulation process and accompanying equipment for the production of ABS.

Due to the disadvantages associated with thermal dryer 24 and other aspects of prior art coagulation process 10, a direct latex coagulation process has been employed in the prior art. An example of a direct latex coagulation process is indicated generally at 30 and is shown in FIG. 2.

In direct latex coagulation process 30, a coagulator extruder 32 is employed. Coagulator extruder 32 is a twin-screw extruder, with counter-rotating screws 40 (FIG. 3) that do not intermesh. An ABS latex slurry, indicated by I, consisting of approximately 40% solids by weight, is introduced into coagulator extruder 32, along with coagulant, indicated by J, for coagulation of the ABS and steam, indicated by K, to generate the heat required for coagulation. A first mechanical filter 34, which is shown in FIG. 3, enables the removal of fluids and vapors, indicated by L, from coagulator extruder 32, while keeping solid particulate matter in the extruder.

Figure 3:
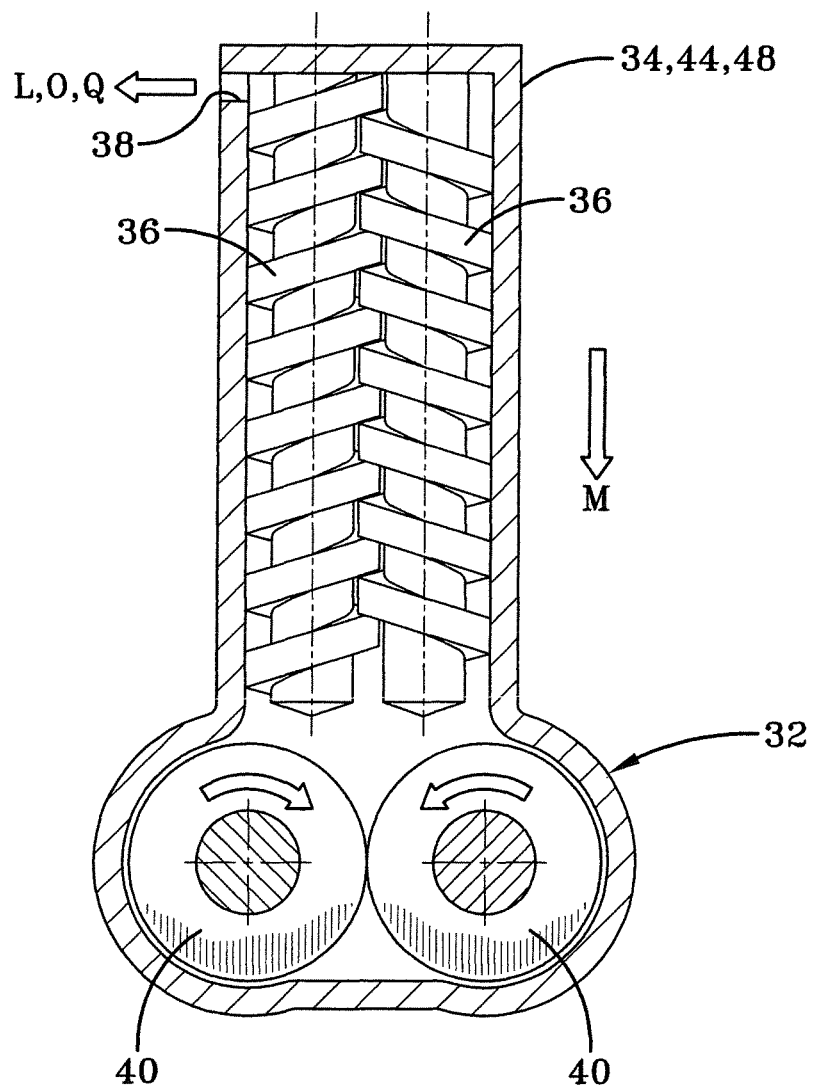
FIG. 3 is a cross-sectional view of a mechanical filter mounted on a coagulator extruder shown in FIG. 2.

As shown in FIG. 3, first mechanical filter 34 includes a pair of intermeshing screws 36 which enable fluids and vapors L to pass to an outlet port 38, while moving solids, indicated by M, back down to twin screws 40 of coagulator extruder 32 for conveying and compounding. Returning now to FIG. 2, after or downstream of a first mechanical filter 34, a first introduction of wash water, indicated by N, is made into coagulator extruder 32. Downstream of first introduction of wash water N, a second mechanical filter 44 removes fluids and vapor, indicated by O, in the same manner as first mechanical filter 34. Upon the removal of fluids and vapor O by second mechanical filter 44, a second introduction of wash water, indicated by P, is made into coagulator extruder 32. Downstream of second introduction of wash water P, a third mechanical filter 48 removes fluids and vapor, indicated by Q, from coagulator extruder 32, while retaining the solids in the extruder, in the same manner as first mechanical filter 34.

A vacuum vent 50 removes additional fluids, indicated by R, from the ABS material in coagulator extruder 32 in order to reduce the moisture content before the ABS graft copolymer material is discharged, indicated by S, from the coagulator extruder. The ABS graft copolymer material is then pelletized by cutting and/or pelletizing means known in the art 51, and the resulting ABS pellets are transferred to compounding extruder 26. Feed to compounding extruder 26, indicated by T, includes the ABS pellets, SAN pellets and additives, similar to that as described above in FIG. 1. As known in the art, compounding extruder 26 melts and mixes the ABS pellets, the SAN pellets, and any other additives, while removing vapors and/or additional moisture, indicated by U, through one or more vents 28 to arrive at a final compounded ABS product, indicated by V.

Since ABS latex coagulator extruder 32 is a single machine, it may be difficult to adjust the coagulator extruder to effectively process a wide range of ABS formulations. In addition, direct latex coagulation process 30 involves the purchase and maintenance of two extruders 26 and 32, which may be undesirably expensive. As a result, certain users have preferred to employ conventional coagulation process 10 rather than direct latex coagulation process 30.

Figure 4:
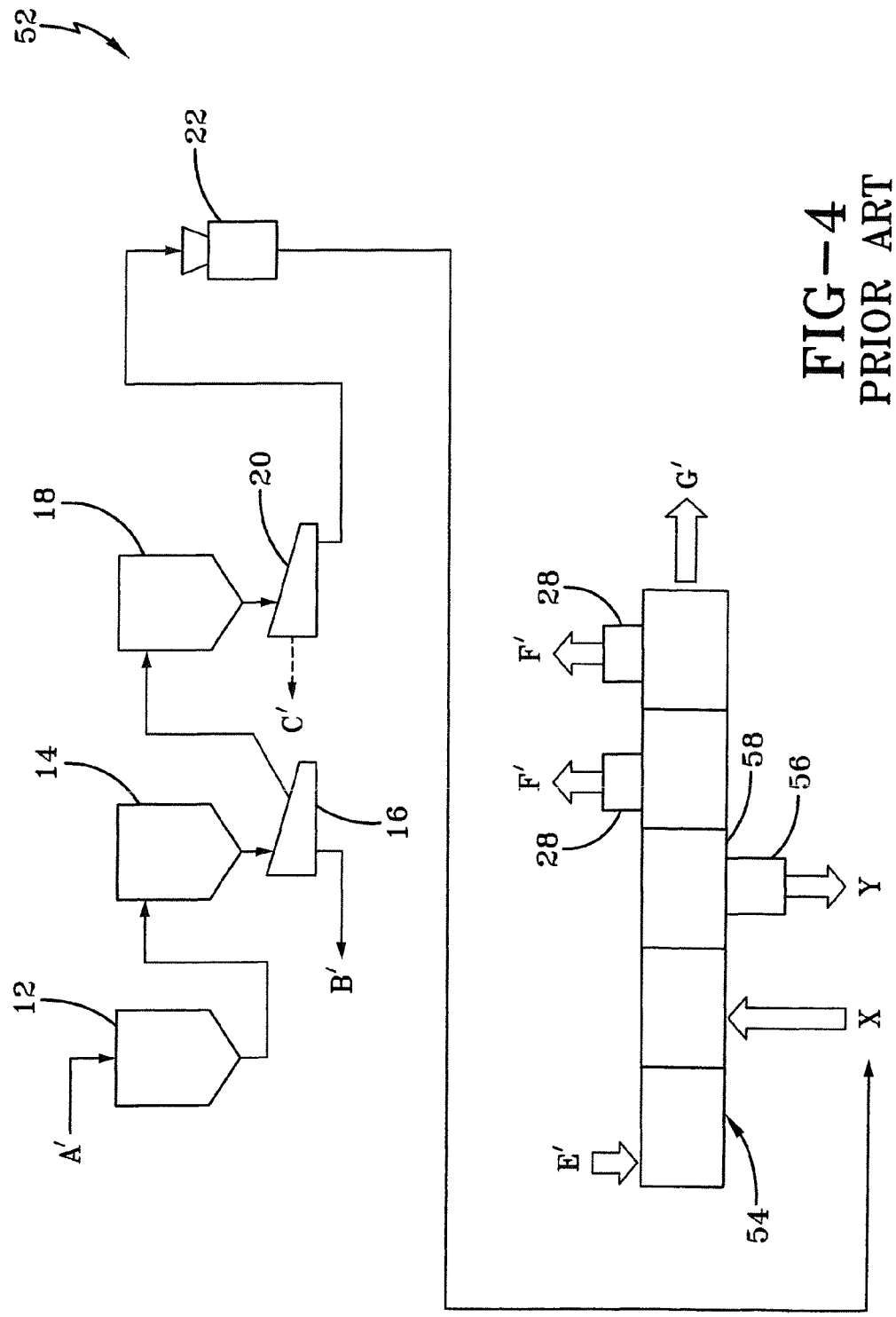
FIG. 4 is a schematic representation of a prior art modified conventional coagulation process and accompanying equipment for the production of ABS.

However, due to the above-described disadvantages of conventional coagulation process 10, modifications to the conventional process have been made. More particularly, a modified conventional ABS coagulation process is indicated generally at 52 and shown in FIG. 4. As with conventional coagulation process 10, in modified conventional coagulation process 52, stripped latex, indicated by A', is introduced into blend tank 12, and coagulation occurs in coagulation tank 14. Effluent, indicated by B', is removed by separation or screening with a first screen 16, and the remaining particles are washed in tank 18. The resulting slurry is fed over second screen 20 to remove some water, indicated by C', and the remaining slurry is introduced into centrifuge 22.

In modified conventional coagulation process 52, after the ABS crumb has been reduced to approximately 20% to 30% moisture in centrifuge 22, the wet ABS crumb, indicated by X is introduced into a dewatering and compounding extruder 54. Introduction of wet ABS crumb X takes place after SAN pellets and additives, indicated by E', have been introduced into dewatering compounding extruder 54, which enables the SAN pellets and additives to melt and thus readily bind with the ABS crumb. Due to the excessive 20% to 30% moisture level of the ABS crumb, it is necessary for compounding extruder 54 to include a dewatering device 56, such as a barrel 58 formed with slits or openings, or a vent stuffer, which allows water, indicated by Y, to pass through the barrel.

Typically, many fines pass through dewatering device 56, creating waste material that must either be recycled, thereby requiring additional equipment and process steps, or disposed of, which generates undesirable waste. As with compounding extruder 26 in conventional coagulation process 10, dewatering compounding extruder 54 of modified conventional coagulation process 52 includes one or more vents 28 to remove additional moisture, indicated by F', to produce dry compounded ABS product, indicated by G'. While dewatering compounding extruder 54 of prior art modified conventional coagulation process 52 has reduced the disadvantage of potential volatility associated with conventional coagulation process 10 by eliminating thermal dryer 24, the modified coagulation process includes its own disadvantages.

More particularly, there are disadvantages associated with introducing ABS crumb having a moisture content exceeding 10% into dewatering compounding extruder 54. For example, a single dewatering machine/extruder 54 has to remove sufficient water to dry and compound the material, and in the prior art, it has been difficult for a single machine to reduce the moisture level of the material to the desired level. In addition, modified conventional coagulation process 52 enables many fines to escape dewatering extruder 54, which, as described above, leads to significant waste. Moreover, the heating of crumb with such a high moisture content in dewatering extruder 54 generates high steam flow, which creates a blow-back effect. This blow-back effect interrupts the conveying of the material through dewatering compounding extruder 54 and prevents fusion of the polymer, which in turn prevents effective compounding of the ABS material.

Due to the advantages of modified conventional coagulation process 52 as compared to prior art conventional coagulation process 10 and prior art direct latex coagulation process 30, it is desirable to develop a single dewatering machine and accompanying process for use in the modified conventional coagulation process which overcomes the disadvantages of prior art machines. The improved dewatering machine and accompanying process of the present invention finds application in modified conventional coagulation process 52, as well as in other dewatering and finishing processes, as will be described below.

Figure 5:
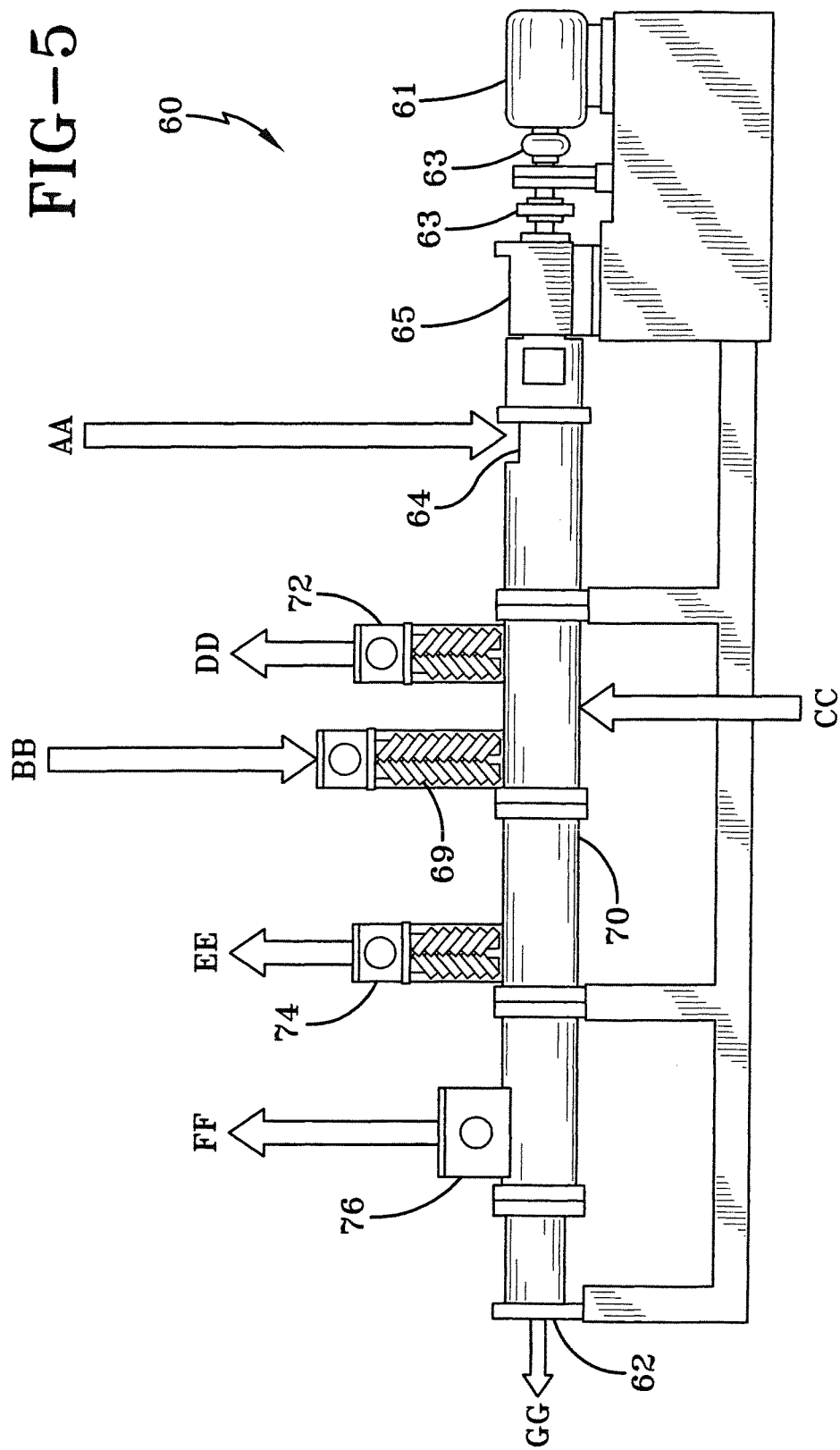
FIG. 5 is a side elevational view of a first embodiment of an improved dewatering machine of the present invention for use in the dewatering of polymers and elastomers.

A first exemplary embodiment of a dewatering machine of the present invention is indicated generally at 60 and is shown in FIG. 5. First embodiment dewatering machine 60 preferably includes a length-to-diameter ratio (l/d) of approximately 54:1. Dewatering machine 60 includes a barrel 70 and counter-rotating, intermeshing twin screws 62 disposed in the barrel. Twin screws 62 are driven by a motor 61 that is connected by couplings 63 and a gearbox 65 to the screws. Screws 62 are counter-rotating, intermeshing screws in order to transfer sufficient energy to the ABS material to fuse the ABS particles together before removing water. This fusing of ABS particles together before water is removed enables a reduction of fines.

Dewatering machine 60 also includes a feed section 64 into which SAN pellets, indicated by AA, are fed. SAN pellets AA are melted in feed section 64 through mechanical action in counter-rotating intermeshing screws 62 to create a continuous phase. After SAN pellets AA have melted, ABS powder, indicated by BB, is introduced into dewatering machine 60 through a side feeder 69. Introduction of ABS powder BB after SAN pellets AA have been melted enables ready adhesion of the ABS powder to the SAN pellets for compounding.

In order to enable drying of ABS material BB and effective compounding with SAN pellets AA, introduction of steam, indicated by CC, is provided immediately prior to the ABS introduction. In this manner, steam introduction CC enables heating of dewatering machine barrel 70 to sufficiently dewater and compound the ABS particles. A restriction (not shown), such as an increasing core diameter of screws 62, is included in dewatering machine 60 downstream of the introduction of ABS powder BB, in order to hold pressure in barrel 70. Due to the increased pressure, steam and water, indicated by DD, is able to be removed by a first mechanical filter 72 upstream of the introduction of ABS powder BB. First mechanical filter 72 operates in a manner similar to that as described above for mechanical filters 34, 44, and 48, that is, removing liquids and vapors while keeping solids in barrel 70. As compounding proceeds, the ABS material moves past the restriction in screws 62 and reaches a second mechanical filter 74, which operates in a manner similar to that of first mechanical filter 72 and continues to remove moisture, indicated by EE. To enable the further removal of moisture, indicated by FF, a vacuum filter 76 is included downstream of second mechanical filter 74, thus ensuring that a dry compounded ABS product, indicated by GG, is discharged from dewatering machine 60. These features enable dewatering machine 60 to achieve a moisture content of less than about 0.5% for the discharged ABS product.

Figure 6:
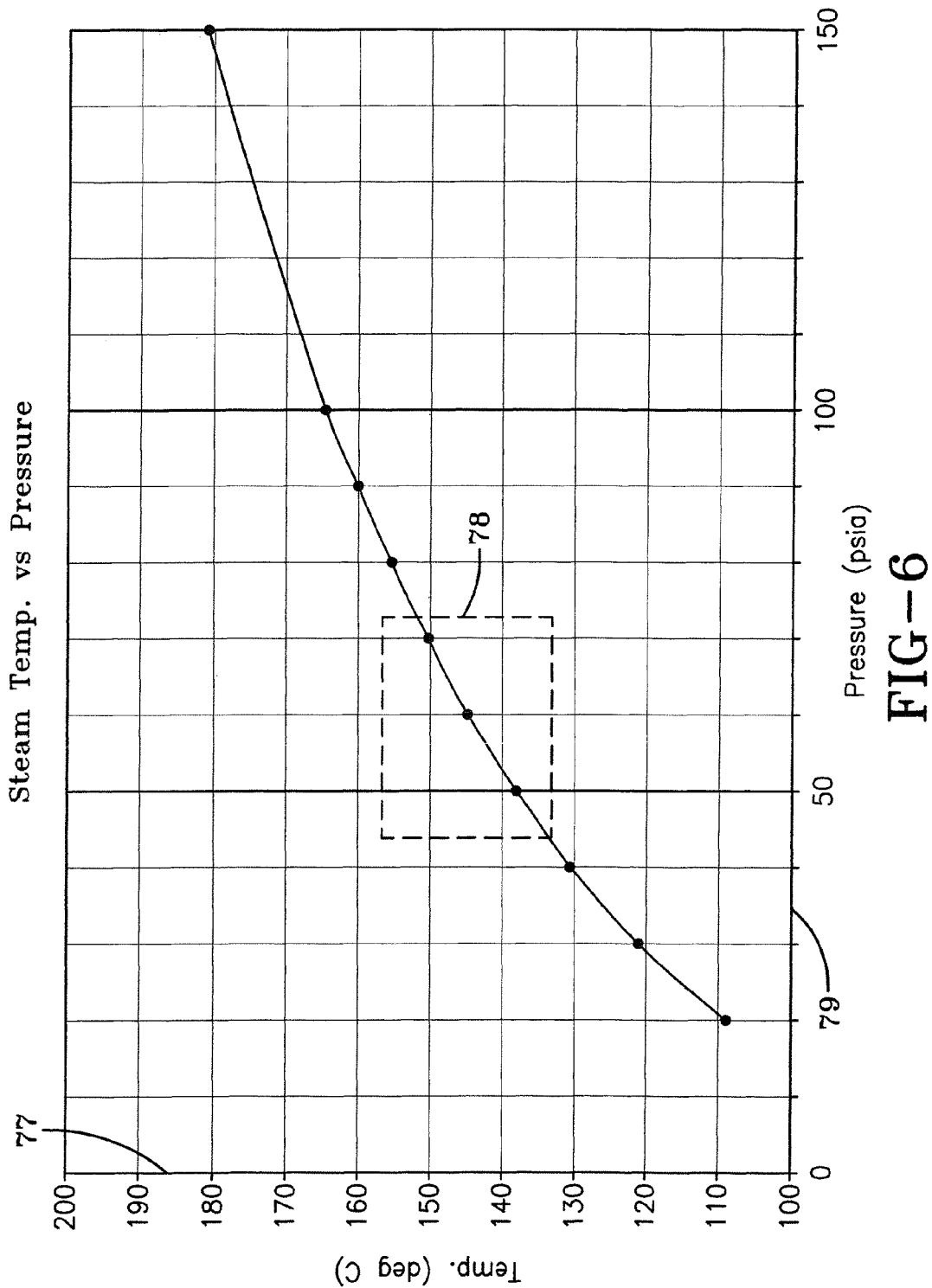
FIG. 6 is a graph of steam temperature versus pressure, indicating optimum processing conditions for the dewatering machine shown in FIG. 5.

As shown in FIG. 6, it has been determined in the present invention that ABS powder BB must reach a critical zone 78 in a temperature 77 of steam introduction CC into dewatering machine 60, and in a pressure 79 in barrel 70 in order to enable the ABS powder to fuse, thereby reducing the amount of fines. Critical zone 78 occurs in a steam temperature range of from about 132 degrees (°) Celsius to about 157° Celsius, and a pressure range of from about 44 pounds per square inch of atmosphere (PSIA) to about 72 PSIA. Because dewatering machine 60 enables critical zone 78 to be reached, fusion of the ABS powder is achieved, and the amount of fines that may escape in the dewatering process is thereby reduced.

Therefore, dewatering machine 60 of the present invention enables dewatering with the use of a single machine, and a reduction of fines that escape the dewatering process. In addition, by employing a solid barrel 70, rather than a barrel with slits or openings, vapors and/or particles that may be volatile are able to be readily contained, which reduces the hazards that are associated with the dewatering process.

Figure 7:
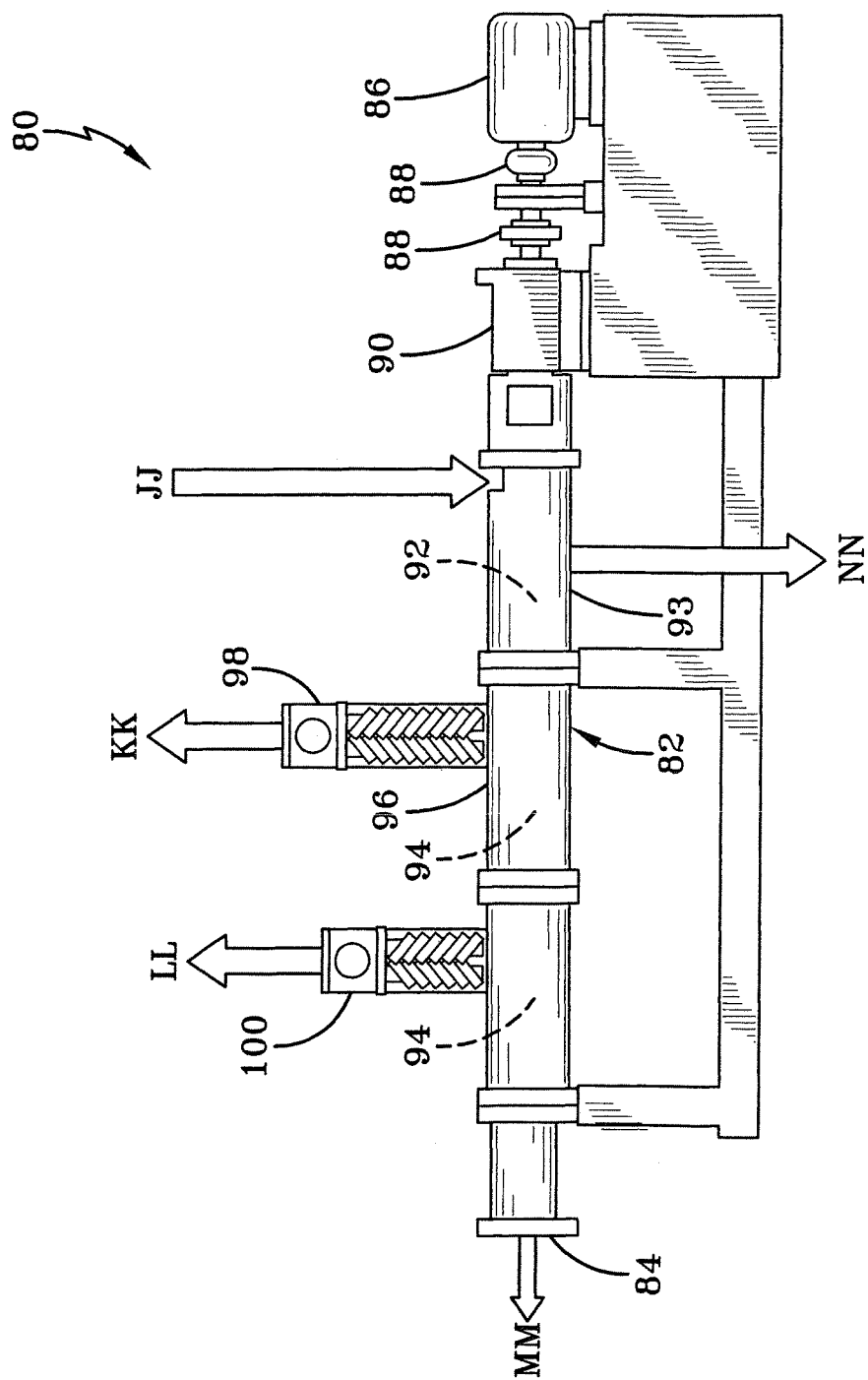
FIG. 7 is a side elevational view of a second embodiment of an improved dewatering machine of the present invention for use in the dewatering of polymers and elastomers.

Turning now to FIG. 7, a second exemplary embodiment of the dewatering machine of the present invention is indicated generally at 80. Second embodiment dewatering machine 80 includes a barrel 82 and twin screws 84 that are disposed in the barrel. Twin screws 84 are driven by a motor 86 that is connected by couplings 88 and a gearbox 90 to the screws.

Screws 84 include an intermeshing portion 92 and a non-intermeshing portion 94. ABS material, indicated by JJ, enters barrel 82 at intermeshing portion 92. ABS material JJ preferably has a moisture content of up to about 20% water by weight. An optional wedgebar bottom drain 93 may be included in barrel 82 at intermeshing portion 92 to remove free water entering the machine, indicated by NN, especially with higher moisture feed materials. The nature of intermeshing portion 92 and non-intermeshing portion 94 of twin screws 84 enhances the dewatering and devolatilization capability of dewatering machine 80, while reducing the escape of fines and eliminating the need to introduce SAN pellets to enhance processing characteristics as in first embodiment dewatering machine 60.

In intermeshing portion 94, channels (not shown) of twin screws 84 are closed axially and cross-channel, which reduces the leakage of fluids and fines. More particularly, intermeshing portion 92 of counter-rotating twin screws 84 is a positive conveying twin screw geometry, which enables all moisture to be pushed forward with fused polymer to a dewatering section 96 of dewatering machine 80. This positive feeding and conveying action by intermeshing portion 92 of twin screws 84 enables small particle sizes in a range of from about 0.1 mm to about 4.0 mm, that is, fines, to be conveyed without degradation of the ABS material or loss of the fines. It is to be understood that, while optimum performance is obtained from counter-rotating twin screws 84, the screws may also be co-rotating, intermeshing types with channels that are closed axially and cross-channel in intermeshing portion 92, without affecting the overall concept or operation of the invention.

In intermeshing portion 92, the preferred degree of intermeshing of twin screws 84 may be expressed as a ratio of the bore diameter of barrel 82 to the distance from the inner or bore wall of the barrel to the center line of the screws. For example, for an intermeshing portion 92 with a bore diameter of about 2.35 inches and a center line distance between the screws of about 2.0 inches, the resulting bore to root diameter ratio is about 1.424. The bore to root diameter ratio may be as high as 1.78, with lower values providing higher shear and positive conveying, while larger values provide lower shear.

After passing intermeshing portion 92 of twin screws 84, the ABS material enters non-intermeshing portion 94 of the twin screws and a first mechanical filter 98. By passing to non-intermeshing portion 94 of twin screws 84, the removal of water and vapors, indicated by KK, is readily achieved by first mechanical filter 98, which is similar in construction and operation to mechanical filters 72 and 74 of first embodiment dewatering machine 60 described above. After passing first mechanical filter 98, the ABS material continues through barrel 82 along non-intermeshing portion 94 of twin screws 84 to a second mechanical filter 100. Second mechanical filter 100 is similar in construction and operation to first mechanical filter 98, and removes additional moisture and vapors, as indicated by LL, thereby enabling dewatered ABS product, indicated by MM, to be discharged from dewatering machine 80 at a moisture level containing less than about 0.5 weight percent of water.

Such a low moisture content is able to be reached due to the use of a single dewatering machine 80 with twin screws 84, which include a bore diameter of intermeshing portion 92 of 2.35 inches, and a bore diameter of non-intermeshing portion 94 of 2.0 inches. Dewatering machine 80 yields a throughput rate of approximately 300 to 450 pounds of dewatered ABS product per hour.

By employing twin screws 84 which change from intermeshing portion 92 to non-intermeshing portion 94, over-heating of the ABS material is prevented, while positive feeding and conveying to reduce fines with effective dewatering of the material is accomplished. If necessary, depending on design considerations, steam introduction or injection may optionally be provided along barrel 82 for direct contact heating, or direct contact cooling by injection of tempered water may be provided. Such direct contact heating or cooling may be provided in order to adapt dewatering machine 80 for different through-put rates and/or materials. In addition, the length and/or diameter of dewatering machine 80 may be adapted to accomplish different throughput rates, as desired.

In the prior art, openings or slits formed in dewatering machine barrels along the length of the barrels allowed fines to escape, and would often plug, which would enable water to undesirably build up in the feed section of the machine. By providing positive feeding and conveying that fuses the material, and including barrel 82 either without openings or slits, or with an optional limited wedgebar area 93, dewatering machine 80 reduces or eliminates the undesirable escape of fines and build up of water encountered in the prior art.

In addition, openings or slits along the length of prior art dewatering machine barrels allowed steam to be discharged to atmosphere through the openings or slits, which may be undesirable due to the presence of volatile particles or vapors. Moreover, prior art dewatering machines that employ co-rotating twin screws have a large vapor path which enables higher losses of polymer particles. Dewatering machine 80 includes barrel 82 that is generally solid and counter-rotating, intermeshing twin screws 84, so that vapors and/or particles that may be volatile are able to be readily contained. Dewatering machine 80 is enclosed, and appropriate piping or conduit (not shown) may be set up to enable the removal of steam, water, vapors, and other discharges. As a result, dewatering machine 80 provides greatly reduced emissions and recovery of vapors, monomers, and heat, which reduces the hazards that are associated with the dewatering process.

Figure 8:
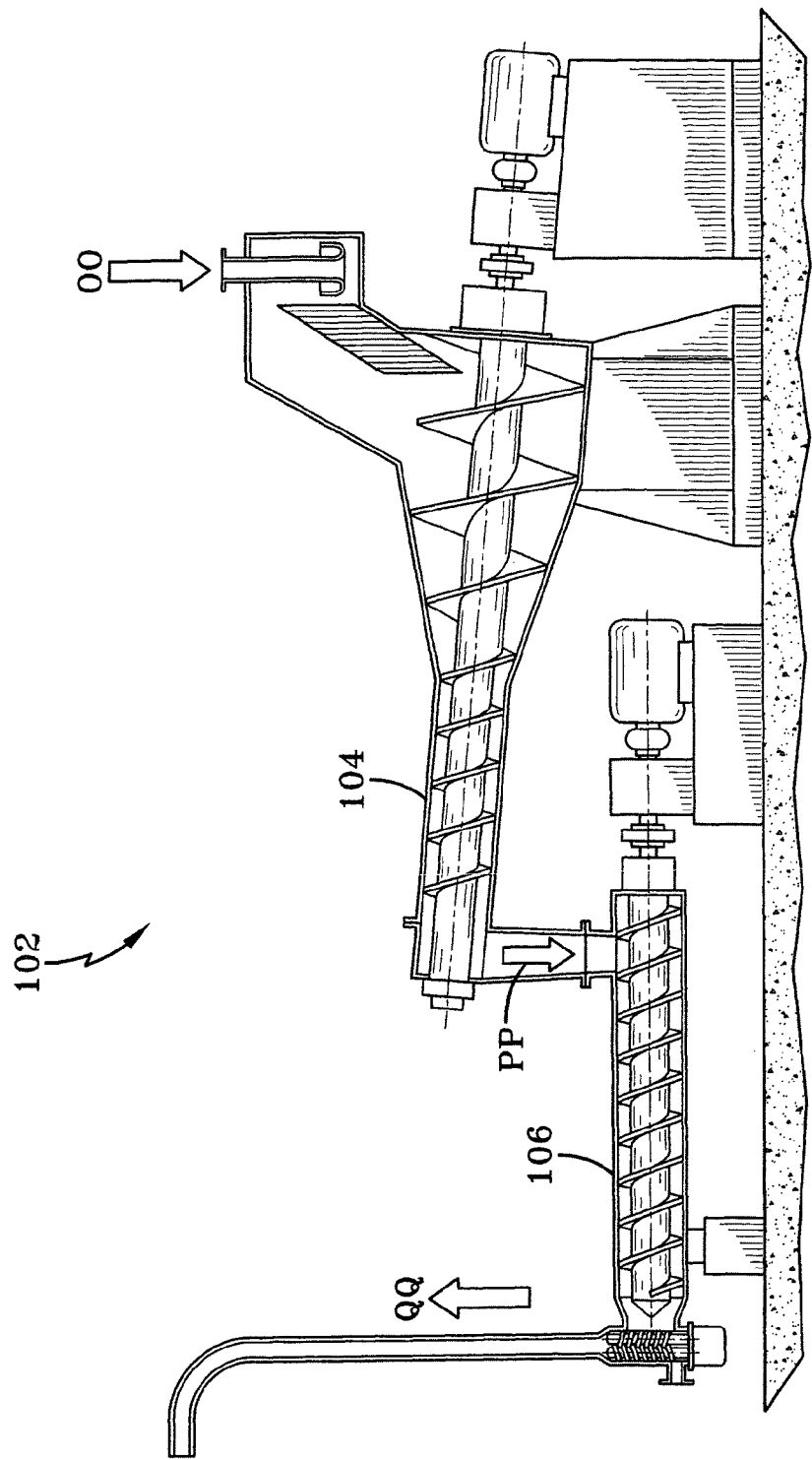
FIG. 8 is a side elevational view of a prior art elastomer or rubber dewatering system.

With reference now to FIG. 8, a prior art process for the dewatering of rubber slurry is indicated generally at 102. In the prior art rubber slurry dewatering process 102, a first dewatering machine 104 typically is employed to receive slurry, indicated by OO, at a moisture content of about 50% to 95%, and mechanically dewater the rubber slurry to a moisture level of approximately 10% to 15%. The slurry material with the reduced moisture level, indicated by PP, is then fed into a second dewatering machine 106, which reduces the moisture content of the material to about 1% to 3%, indicated by QQ. Material QQ is then transferred for further drying or finishing operations. The use of first and second dewatering machines 104, 106, respectively, involves a capital investment, continued operation, and maintenance of two separate machines, which may be undesirable for certain users.

Figure 9:
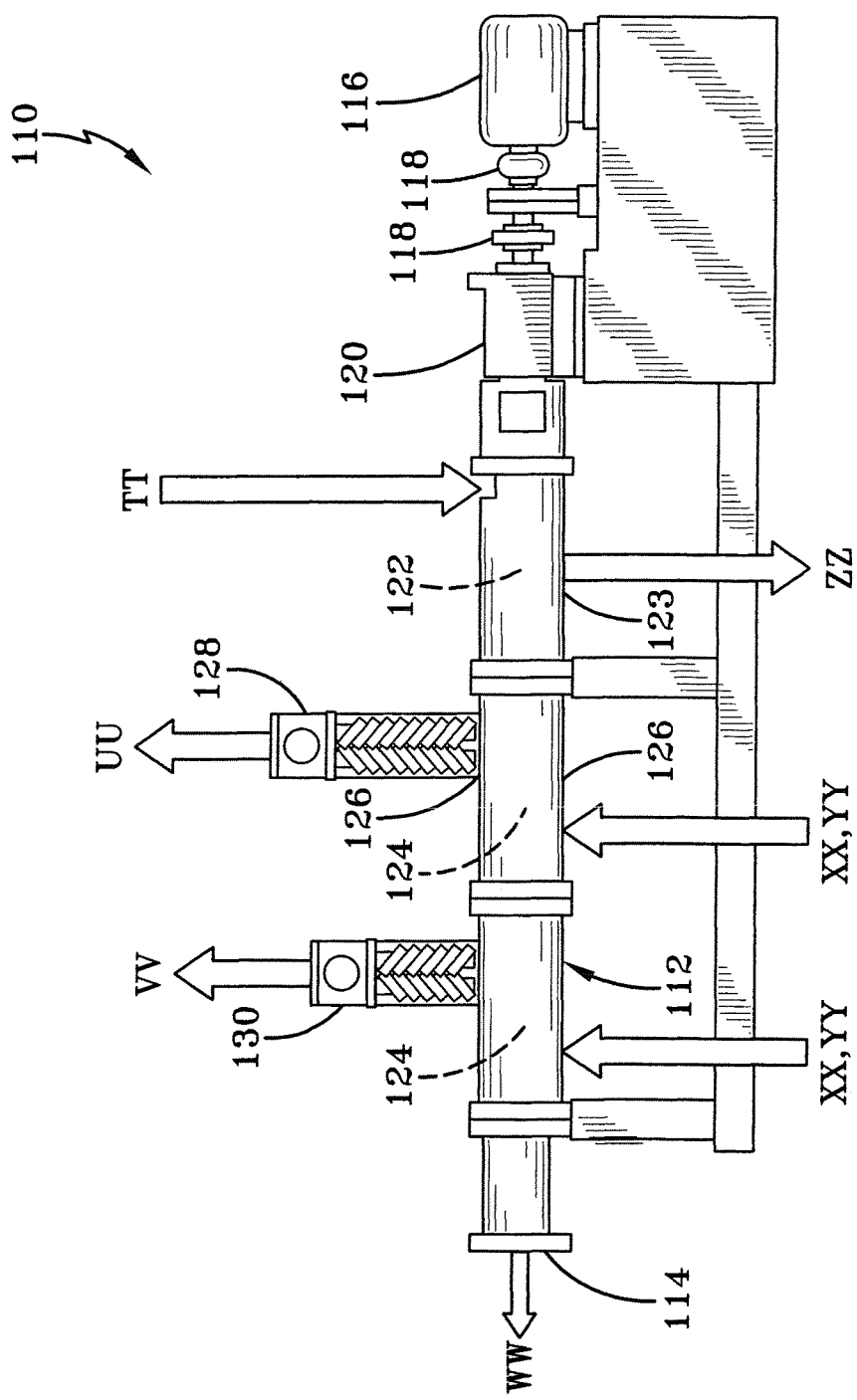
FIG. 9 is a side elevational view of a third embodiment of an improved dewatering machine of the present invention for use in dewatering of polymers and elastomers.

The present invention finds application in the dewatering of other polymers and elastomers with a single machine, as shown by a third exemplary embodiment of the dewatering machine of the present invention, which is indicated generally at 110 and shown in FIG. 9. Third embodiment dewatering machine 110 includes a barrel 112 and twin screws 114 that are disposed in the barrel. Twin screws 114 are driven by a motor 116 that is connected by couplings 118 and a gearbox 120 to the screws. A rubber crumb material, indicated by TT, which preferably has a moisture content of up to about 50% water by weight, is fed into barrel 112 at an intermeshing portion 122 of screws 114. More particularly, screws 114 include an intermeshing portion 122 and a non-intermeshing portion 124. The nature of intermeshing portion 122 and non-intermeshing portion 124 of twin screws 114 enhances the dewatering and devolatilization capability of dewatering machine 110.

In intermeshing portion 122, channels (not shown) of twin screws 114 are closed axially and cross-channel, which reduces the leakage of fluids and fines. More particularly, intermeshing portion 122 of counter-rotating twin screws 114 is a positive conveying twin screw geometry, which enables all moisture to be pushed forward with fused polymer to a dewatering section 126 of dewatering machine 110. This positive feeding and conveying action by intermeshing portion 122 of twin screws 114 enables small particle sizes in a range of from about 0.1 mm to about 4.0 mm, that is, fines, to be conveyed without degradation of the elastomer or rubber or loss of the fines. It is to be understood that, while optimum performance is obtained from counter-rotating twin screws 114, the screws may also be co-rotating, intermeshing types with channels that are closed axially and cross-channel in intermeshing portion 122, without affecting the overall concept or operation of the invention.

An optional wedgebar drain 123 may be included in barrel 112 of dewatering machine 110 at intermeshing portion 122 to remove free water entering the machine, indicated by ZZ, especially with higher moisture feed materials. For example, wedgebar drain 123 may be a dewatering screen or dewatering slits formed in barrel 112. It is to be understood that the rear drain typically is not a primary moisture removing device, but by providing additional drainage, may assist or optimize the feeding of high moisture feed slurry.

In intermeshing portion 122, the preferred degree of intermeshing of twin screws 114 may be expressed as a ratio of the bore diameter of barrel 112 to the distance from the inner or bore wall of the barrel to the center line of the screws. For example, for an intermeshing portion 122 with a bore diameter of about 2.35 inches and a center line distance between the screws of about 2.0 inches, the resulting bore to root diameter ratio is about 1.424. The bore to root diameter ratio may be as high as 1.78, with lower values providing higher shear and positive conveying while larger values provide lower shear.

After passing intermeshing portion 122 of twin screws 114, the rubber enters non-intermeshing portion 124 of the twin screws and a first mechanical filter 128. By passing to non-intermeshing portion 124 of twin screws 114, the removal of water and vapors, indicated by UU, is readily achieved by first mechanical filter 128, which is similar in construction and operation to mechanical filters 98 and 100 of second embodiment dewatering machine 80 described above. After passing first mechanical filter 128, the rubber continues through barrel 112 along non-intermeshing portion 124 of twin screws 114 to a second mechanical filter 130. Second mechanical filter 130 is similar in construction and operation to first mechanical filter 128, and removes additional moisture, indicated by VV, thereby enabling dewatered rubber or elastomer product, indicated by WW, to be discharged from dewatering machine 110 at a moisture level that is in a desirable range of from about 0.5 to about 3.0 weight percent of water.

Such a low moisture content is able to be reached due to the use of a single dewatering machine 110 with twin screws 114, which include a bore diameter of intermeshing portion 122 of 2.35 inches, and a bore diameter of non-intermeshing portion 124 of 2.0 inches. By employing twin screws 114 which change from intermeshing portion 122 to non-intermeshing portion 124, overheating of the elastomer is prevented, while positive feeding and conveying to reduce fines with effective dewatering of the material is accomplished. If necessary, depending on design considerations, steam introduction or injection, indicated by XX, may optionally be provided in barrel 112 for direct contact heating, or direct contact cooling, indicated by YY, may be provided in order to adapt dewatering machine 110 for different through-put rates and/or materials. In addition, the length and/or diameter of dewatering machine 110 may be adapted to accomplish different throughput rates, as desired.

In the prior art, openings or slits formed in dewatering machine barrels along the length of the barrels allowed fines to escape, and would often plug, which would enable water to undesirably build up in the feed section of the machine. By providing positive feeding and conveying that fuses the material, and including barrel 112 either without openings or slits, or with optional limited wedgebar area 123, dewatering machine 110 reduces or eliminates the undesirable escape of fines and build up of water encountered in the prior art.

In addition, openings or slits in prior art dewatering machine barrels allowed steam to be discharged to atmosphere through the openings or slits, which may be undesirable due to the presence of volatile particles or vapors. By employing a barrel 112 that is generally solid, rather than a barrel with slits or openings, vapors and/or particles that may be volatile are able to be readily contained, which reduces the hazards that are associated with the dewatering process.

Moreover, the amount of energy imparted to the rubber in the dewatering process can be precisely controlled using optional steam injection, as indicated by XX, in barrel 112 to add heat, or optional tempered water, as indicated by YY, to remove heat. When tempered water, as indicated by YY, is employed, the tempered water is subsequently removed from dewatering machine 110 through mechanical filters 128, 130. Such precise control of the amount of energy that is imparted to the rubber allows the rubber to be precisely dried and cooled to the desired discharge condition.

Through the use of the above-described structural features, dewatering machine 60, 80, and 110 of the present invention enables efficient and effective dewatering of polymers and elastomers that are in a wet slurry with a single machine. In addition, by providing a structure that conveys and fuses fines together, the escape of fines from dewatering machine 60, 80, and 110 of the present invention is desirably reduced. Also, because dewatering machine 60, 80, 110 is enclosed, vapors and/or particles that may be volatile are able to be readily contained, which reduces the hazards that are associated with the dewatering process.

The present invention also includes a method of dewatering polymers or elastomers that accompanies the above-described exemplary embodiments of dewatering machine 60, 80, 110, including steps in accordance with the description that is presented above and shown in FIGS. 5-7 and 9.

It is to be understood that the present invention finds application in the dewatering of materials other than those shown and described herein and which are known to those skilled in the art, without affecting the concept or operation of the invention. For example, the invention finds application in the dewatering or devolatilization of any material that is processed in a wet slurry with fines, such as elastomeric copolymers, including any ABS graft copolymer, styrene acrilo nitrile (SAN) pellets, butadiene rubber (BR), nitrile rubber (NBR), isoprene rubber (IR), butyl or isobutylene-isoprene rubber (IIR), chloroprene rubber (CR), acrylate rubbers, styrene butadiene rubber (SBR), styrene butadiene styrene rubber (SBS), styrene isoprene styrene (SIS), ethylene propylene rubber (EPR), epichlorohydrin rubber, any synthetic rubber or thermoplastic elastomer (TPE), thermoplastic rubber (TPR) with fines, or any biomass materials, including wood or sugarcane.

It is to be further understood that the structure of dewatering machine 60, 80, 110 of the present invention may be altered or rearranged without affecting the overall concept or operation of the invention. For example, dewatering machine 60, 80, 110 may be adapted so that the screws are counter-rotating and intermeshing, with a constant-bore diameter, without affecting the overall concept or operation of the invention. In such an adaptation, in a first portion of each respective feed section, which is equivalent to a length that is approximately twelve times the diameter of each screw, the screws are closed across the channel, and are fully intermeshing, which prevents liquids and vapors from easily flowing along the axis of the screws. Downstream of this portion, the flights of the screws are narrower, for example, about 10 to 20% of the screw diameter, which provides a large clearance from the flank of one screw to the other, thereby enabling flow of liquids and vapors between the screws and along the axis of the screws in a manner similar to that of the non-intermeshing geometry. An adaptation such as this provides a simpler mechanical construction of dewatering machine 60, 80, 110, which enables removal of the screws without the need to move a gear box or remove a barrel of each respective machine.

As an additional example, while dewatering machine 60, 80, 110, has been described above as a single machine, depending on particular design requirements, it may be desirable to incorporate the features of the dewatering machine into two separate machines. Moreover, it is to be understood that reference herein has been made to the term dewatering with the understanding that such reference also includes drying, without affecting the overall concept or operation of the invention.

Accordingly, the improved dewatering machine and process is simplified, provides an effective, safe, inexpensive, and efficient structure which achieves all the enumerated objectives, provides for eliminating difficulties encountered with prior art dewatering machines and processes, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved dewatering machine and process is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A dewatering machine for reducing moisture of at least one of a polymer and an elastomer, said machine comprising:
    a generally solid barrel, said barrel being formed with an opening for receiving a feed of said at least one of said polymer and said elastomer in said machine;
    a pair of counter-rotating screws disposed in said barrel, at least a portion of said screws being intermeshing, and wherein said screws include a geometry that is closed axially and cross-channel;
    drive means coupled to said screws to cause the screws to rotate, whereby said screws transfer energy to said at least one of said polymer and said elastomer to fuse particles of the at least one of the polymer and the elastomer together; and
    at least one mechanical filter connected to said barrel to remove moisture from said at least one of said polymer and said elastomer after said particles have been fused, whereby an amount of fines escaping the machine is reduced, and said moisture of the at least one polymer is reduced from up to 40 percent water by weight to less than 0.5 percent water by weight and of the at least one elastomer is reduced from up to 50 percent water by weight to less than 3.0 percent water by weight.

2. The dewatering machine of claim 1,
    further comprising a second opening formed in said barrel for receiving an additive material; and
    means for introducing steam into said barrel downstream of said second opening.

3. The dewatering machine of claim 2, further comprising a restriction in said barrel downstream of said second opening, wherein said restriction holds pressure in the barrel.

4. The dewatering machine of claim 1, further comprising a vacuum filter connected to said barrel downstream of said at least one mechanical filter.

5. The dewatering machine of claim 1, wherein said said screws are formed with a non-intermeshing portion.

6. The dewatering machine of claim 5, wherein a ratio of a bore diameter of said barrel to a distance extending from an inner wall of said barrel to a centerline of said screws is from about 1.4 to about 1.78.

7. The dewatering machine of claim 1, further comprising a wedgebar drain.

8. The dewatering machine of claim 1, further comprising means connected to said barrel for direct contact heating of said machine.

9. The dewatering machine of claim 1, further comprising means connected to said barrel for direct contact cooling of said machine.

10. The dewatering machine of claim 1, wherein said at least one of said polymer and said elastomer is selected from the group consisting of acrylonitrile butadiene styrene, styrene acrilo nitrile, butadiene rubber, nitrile rubber, isoprene rubber, butyl or isobutylene-isoprene rubber, chloroprene rubber, acrylate rubbers, styrene butadiene rubber, styrene butadiene styrene rubber, styrene isoprene styrene, ethylene propylene rubber, epichlorohydrin rubber, synthetic rubber, thermoplastic elastomer, thermoplastic rubber, and biomass materials.

11. A method of dewatering for reducing moisture of at least one of a polymer and an elastomer, said method comprising the steps of:
    providing a dewatering machine including a generally solid barrel;
    disposing a pair of counter-rotating screws in said barrel, at least a portion of said screws being intermeshing, and wherein the screws include a geometry that is closed axially and cross-channel;
    rotating said screws with drive means;
    feeding said at least one of said polymer and said elastomer into an opening formed in said barrel and into said screws;

fusing particles of said at least one of said polymer and said elastomer together to reduce an amount of fines escaping said machine by transferring energy from said screw rotation to the at least one of said polymer and said elastomer;

after said particles have been fused, removing moisture from said at least one of said polymer and said elastomer with at least one mechanical filter connected to said barrel; and reducing said moisture of said at least one polymer from up to 40 percent water by weight to less than 0.5 percent water by weight and of said at least one elastomer from up to 50 percent water by weight to less than 3.0 percent water by weight.

12. The method of dewatering of claim 11, further comprising the steps of:

feeding an additive material into a a second opening formed in said barrel; and introducing steam into said barrel downstream of said second opening.

13. The method of dewatering of claim 11, further comprising the step of retaining pressure in said barrel with a restriction in the barrel downstream of said second opening.

14. The method of dewatering of claim 11, further comprising the step of drawing a vacuum in said barrel with a vacuum filter connected to the barrel downstream of said at least one mechanical filter.

15. The method of dewatering of claim 11, wherein said step of fusing particles of said at least one of said polymer and said elastomer includes forming said screws with a non-intermeshing portion.

16. The method of dewatering of claim 11, wherein the step of fusing particles of said at least one of said polymer and said elastomer further comprises the steps of heating the at least one of the polymer and the elastomer to a range of from about 132 degrees Celsius to about 157 degrees Celsius, and maintaining a pressure in said barrel of from at least about 44 pounds per square inch of atmosphere.

17. The method of dewatering of claim 11, further comprising the step of draining free water from said barrel with a wedgebar drain in a feed section of the barrel.

18. The method of dewatering of claim 11, further comprising the step of heating said machine with steam injection.

19. The method of dewatering of claim 11, further comprising the step of cooling said machine with an introduction of tempered water.

20. The method of dewatering of claim 11, wherein said at least one of said polymer and said elastomer is selected from the group consisting of acrylonitrile butadiene styrene, styrene acrilo nitrile, butadiene rubber, nitrile rubber, isoprene rubber, butyl or isobutylene-isoprene rubber, chloroprene rubber, acrylate rubbers, styrene butadiene rubber, styrene butadiene styrene rubber, styrene isoprene styrene, ethylene propylene rubber, epichlorohydrin rubber, synthetic rubber, thermoplastic elastomer, thermoplastic rubber, and biomass materials.

* * * * *